United States Patent [19]

Tanaka et al.

[11] Patent Number: 5,074,458
[45] Date of Patent: Dec. 24, 1991

[54] METHOD OF PRODUCING BIMETAL FOR USE AS MATERIAL FOR PLAIN BEARING

[75] Inventors: Tadashi Tanaka, Konan; Masaaki Sakamoto, Nagoya; Koichi Yamamoto, Komaki; Hideyuki Kidokoro, Komaki, all of Japan

[73] Assignee: Daido Metal Company, Ltd., Nagoya, Japan

[21] Appl. No.: 655,594

[22] Filed: Feb. 15, 1991

[30] Foreign Application Priority Data

Mar. 29, 1990 [JP] Japan ................................. 2-81845

[51] Int. Cl.$^5$ ............................................ B23K 31/00
[52] U.S. Cl. .................................... 228/232; 228/158; 228/208; 228/248; 219/10.61 R; 29/898
[58] Field of Search ............... 228/158, 208, 232, 248, 228/238, 263.16; 219/9.5, 10.41, 10.57, 10.61 R; 29/898, 898.042

[56] References Cited

U.S. PATENT DOCUMENTS 3,831,258 8/1974 Elbert et al. ........................... 29/898
4,141,482 2/1979 Reynolds ............................. 228/158
4,788,396 11/1988 Maugein et al. ............. 219/10.61 R
4,813,965 3/1989 Roberts ............................... 228/232

Primary Examiner—Samuel M. Heinrich
Attorney, Agent, or Firm—Browdy and Neimark

[57] ABSTRACT

There is disclosed a method of producing a bimetal for use as a material for a plain bearing. A copper alloy powder is placed on a back steel. The back metal and the copper alloy powder are preheated to a temperature near a Curie point of the steel in a reducing atmosphere by high-frequency induction heating. The preheated back steel and copper alloy powder are heated to a temperature of 770° C. to 950° C. in one of an electric resistance furnace and a gas furnace in a reducing atmosphere so that the copper alloy powder is sintered to form a sintered copper alloy layer and at the same time the sintered copper alloy layer is bonded to the back steel, thereby producing the bimetal.

7 Claims, 1 Drawing Sheet

F I G. 1
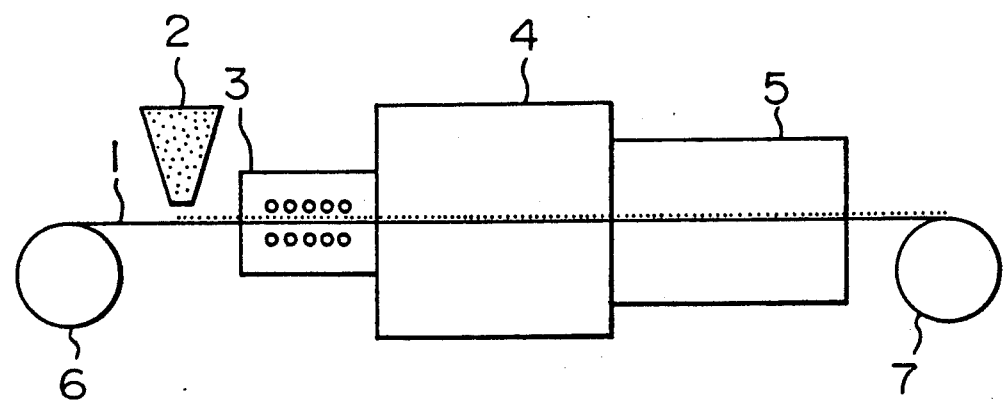

METHOD OF PRODUCING BIMETAL FOR USE AS MATERIAL FOR PLAIN BEARING

BACKGROUND OF THE INVENTION

This invention relates to a method of producing a copper-based material for a plain bearing, and more particularly to a method of producing a sintered bimetal for use as a material for a plain bearing which bimetal has a layer of copper-lead alloy, a lead-bronze alloy, or a bronze alloy, bonded to a back metal.

The present invention is intended to improve conventional methods of producing a bearing material, and is directed to a method of producing a bimetal for a copper based alloy plain bearing for use in various equipment and machines required to achieve low cost and high performance, such as an automobile, ship, electric equipment, office automation equipment, agricultural machines, machine tools, food machines, and other industrial machines.

In a conventional method of producing a copper-based bearing material, copper alloy powder is spreaded onto a back metal, and then the back metal with the powder is introduced into an electric furnace or a gas furnace where the powder is subjected to a primary sintering in a reducing atmosphere, and then a porous alloy layer resulting from the above sintered powder is compressed by a primary rolling, and then this intermediate product is again introduced into an electric furnace where the alloy layer is subjected to a secondary sintering so as to enhance the degree of sintering of the alloy layer, and then a secondary rolling is carried out to effect the sizing and to increase the strengths of the alloy layer and the back metal.

In such a method of producing a copper-based sintered bimetal, the best way of reducing the cost is to increase the sintering speed. However, with the conventional resistance-heating method performed by a heating element of the electric furnace, the material is heated by radiation heat from the heating element, bricks, or a muffle, and therefore it takes considerable time to heat the material to the sintering temperature, thus failing to achieve an increased sintering speed. Therefore, in order to increase the sintering speed, the length of the electric furnace has been increased, or the sintering temperature has been increased. However, a space available in a plant or factory is limited. And besides, when the temperature is increased, the sintering is liable to be excessive, so that the quality of the product is not stable. Thus, it is difficult to achieve a satisfactory control during the production at the plant. Further, where the thick back metal is used, it takes much time to heat the back metal, and the surface of the alloy is heated faster than the inner part of the alloy and the bonding part As a result, the sintering starts from the surface of the alloy, so that the thus sintered surface prevents a reducing gas from flowing toward the inner part of the ally, thus failing to obtain a satisfactory bonding strength and a satisfactory strength of the alloy. In view of this, a preheat zone is provided at the sintering furnace, and the powder and the back metal are heated to a temperature slightly lower than the temperature of sintering of the alloy to thereby effect in a reducing atmosphere the reducing of both the powder and the bonding surface of the back metal, and thereafter the sintering is carried out in a main sintering zone. Therefore, this method suffers from the problem that the sintering speed is decreased or the problem that the length of the furnace is made longer.

SUMMARY OF THE INVENTION

It is an object of this invention to provide a method of producing a copper-alloy bimetal for use as a material for a plain bearing, which method overcomes the problems of the prior art.

According to the present invention, there is provided a method of producing a bimetal for use as a material for a plain bearing, comprising the steps of:

(a) placing copper alloy powder on a back metal of steel;

(b) preheating the back metal and the copper alloy powder to a temperature near a Curie point of the steel in a reducing atmosphere by high-frequency induction heating; and (c) heating the preheated back metal and copper alloy powder to a temperature of 770° C. to 950° C. in one of an electric resistance furnace and a gas furnace in a reducing atmosphere whereby the copper alloy powder is sintered to form a sintered copper alloy layer, and at the same time the sintered copper alloy layer is bonded to the back metal, thereby producing the bimetal.

Preferably, the bimetal is rolled after the sintering so as to make the sintered copper alloy layer dense.

Preferably, at least one of the high-frequency induction heating, the sintering and the rolling is repeated a required number of times.

In the present invention, in order to increase the sintering speed, attention has been directed to the high-frequency induction heating in the reducing atmosphere. When the back metal and the powder placed on the back metal are passed through a high-frequency coil, an induction current (eddy current) flows through the back metal, so that the back metal is directly heated by an eddy current loss. Therefore, the heating speed is high, and besides the heating is carried out efficiently. Further, since the current flows through the back metal in a concentrating manner, the heating begins from the back metal, so that the sintering of the copper alloy powder begins from the surface of contact between the back metal and the powder (i.e., the bonding surface) due to the heat transfer from the back metal. Thus, the flow of the reducing gas is not prevented by the sintered outer surface of the powder, and the gas can flow sufficiently that the sound sintered product can be obtained. However, there still remains the problem that due to the high-frequency electromagnetic induction effect, the back metal is vibrated, so that the powder placed on the back metal is apt to fall off the back plate. Therefore, in order to overcome this vibration problem, the high frequency of not less than 100 kHz is applied. The electromagnetic induction force is inversely proportional to the squar of the frequency.

As shown in Table 1, the depth of penetration of the eddy current becomes smaller as the frequency becomes higher. Therefore, when the thickness of the back metal is smaller than the penetration depth, the heating efficiency is degraded. For this reason, in order to efficiently heat such a back metal with a thickness of 1 mm to 2 mm as generally used as a bearing material for an automobile, the high frequency of about 200 kHz is needed.

However, beyond the Curie point (about 769° C.) of steel of which the back metal is made, the penetration depth of the eddy current becomes further greater than the thickness of the back metal, as shown in Table 1, and the flowing current is limited to an extremely localized portion, so that the heating efficiency is extremely decreased (A practical and effective value of the thickness of the back metal plate is not less than four times greater than the penetration depth of the current). To overcome this difficulty, the back metal is rapidly preheated to a temperature near the Curie point (769° C.), utilizing the high-frequency induction heating in the reducing atmosphere, and thereafter the main sintering is carried out in an ordinary electric furnace or an ordinary gas furnace.

By thus combining the high-frequency induction heating with the heating by the electric furnace or the gas furnace, the sintering speed can be greatly increased, and the energy saving can be achieved because this hearing method achieves a good heat efficiency. Further, since the heating starts from the back metal, the sintering proceeds from the bonding surface, so that the sound sintered product can be obtained, and the bimetal of a good quality can be produced.

TABLE 1

| Temperature (°C.) | Frequency and Current Penetration Depth in Induction-Heating of Carbon Steel | | | | | |
|---|---|---|---|---|---|---|
| | Penetration Depth (mm) at each Frequency (Hz) | | | | | |
| | 50 | 500 | 1,000 | 3,000 | 10,000 | 200,000 |
| 20 | 6.4 | 1.4 | 0.8 | 0.4 | 0.2 | 0.03 |
| 300 | 8.6 | 1.9 | 1.2 | 0.6 | 0.3 | 0.04 |
| 600 | 13.0 | 2.9 | 1.8 | 0.9 | 0.4 | 0.05 |
| 800 | 74.6 | 23.7 | 16.7 | 9.6 | 5.3 | 1.2 |

BRIEF DESCRIPTION OF THE DRAWING

FIG. 1 is a schematic view of a basic construction of an apparatus for producing a bimetal of the present invention.

DESCRIPTION OF THE INVENTION

The present invention will now be illustrated by way of the following Examples:

Tests in the Examples were conducted using a basic apparatus shown in FIG. 1, in which a back steel 1 was fed from an uncoiler 6 and a bimetal was taken up by a coiler 7.

EXAMPLE 1

Cu-25%Pb alloy powder (100 mesh) 2 was distributed onto a 10 μm-thick copper plating layer of a copper-plated back metal 1 of low carbon steel to form a 1 mm-thick layer of the alloy powder 2 thereon. Then, in a high-frequency heating furnace 3, the back steel 1 with the alloy powder 2 was preheated to a temperature near the Curie point of the steel in a reducing atmosphere (30%$H_2$-$N_2$). Then, the back steel 1 with the alloy powder 2 was introduced into an electric furnace 4 where the alloy powder 2 was subjected to a primary sintering in a reducing atmosphere (30%$H_2$-$N_2$). Then, the back steel 1 with the sintered layer was cooled in a cooling chamber 5. Then, the thickness of the sintered layer was reduced (rolling reduction of 1%) by a primary rolling (not shown) (In other words, the density was increased). Then, using a high-frequency heating coil (not shown) and an electric furnace (not shown), the sintered layer was subjected to a secondary sintering under the same conditions as described above, thereby enhancing the degree of sintering of the sintered layer. Finally, the sizing and the strength increase were effected by a secondary rolling (rolling reduction of 4%) which is not shown. A conventional method was also carried out, using the apparatus shown in the drawing, but in this case the high-frequency heating furnace 3 was not operated.

Table 2 shows the sintering conditions and the test results by way of comparison between the method of the present invention and the conventional method. As is clear from the results, with respect to the bimetals produced using the high frequency, the induction current directly flowed through the back steel, so that the back steel was rapidly heated, and therefore the sintering tie required was short. On the other hand, with the heating effected only by the electric furnace, it took long time to heat the back steel to the sintering temperature, and with respect to those bimetals in which the sintering was finished in a short time, the sintering was incomplete, and the binding of the powder particles was weak, and the bonding between such incompletely-sintered layer and the back steel was weak. The total sintering time required for the comparative bimetals was more than twice that for the bimetals of the present invention utilizing the high frequency. Particularly, much time was required in the case where the back metal was thick.

A vacuum tube oscillator of 200 kHz was used as the high-frequency generating device, and the powder was sintered without falling off by the vibration.

EXAMPLE 2

Cu-10%Pb-10%Sn alloy powder (100 mesh) 2 was distributed onto a 10 μm thick copper plating layer of a copper-plated back steel 1 of low carbon steel to form a 1 mm-thick layer of the alloy powder 2 thereon. Then, as in Example 1, in a high-frequency heating furnace 3, the back steel 1 with the alloy powder 2 was preheated to a temperature near the Curie point of the steel in a reducing atmosphere (30%$H_2$-$N_2$). Then, the back steel 1 with the alloy powder 2 was introduced into an electric furnace 4 where the alloy powder 2 was subjected to a primary sintering in a reducing atmosphere (30%$H_2$-$N_2$). Then, the pores of the sintered layer was crushed by a primary rolling (not shown) (rolling reduction of 4%). Then, using a high-frequency heating coil (not shown) and an electric furnace (not shown), the sintered layer was subjected to a secondary sintering under the same conditions as described above, thereby enhancing the degree of sintering of the sintered layer Table 3 shows the sintering conditions and the test results by way of comparison between the method of the present invention and the conventional method. As is clear from the results, with respect to the bimetals produced using the high frequency, the back steel was rapidly heated, and therefore the sintering time required was short, as in Example 1. On the other hand, with the heating effected only by the electric furnace, it took long time to heat the back steel to the sintering temperature, and the total sintering time required for the comparative bimetals was more than twice that for the bimetals of the present invention utilizing the high frequency. Particularly, much time was required in the case where the back steel was thick.

EXAMPLE 3

Cu-11%Sn alloy powder (−120 mesh+280 mesh) 2 was distributed onto a 10 μm-thick copper plating layer of a copper-plated back metal 1 of low carbon steel to form a 0.3 mm-thick layer of the alloy powder 2 thereon. Then, as in Example 1, in a high-frequency heating furnace 3, the back steel 1 with the alloy powder 2 was preheated to a temperature near the Curie point of the steel in a reducing atmosphere (30%$H_2$-$N_2$). then, the back steel 1 with the alloy powder 2 was introduced into an electric furnace 4 where the alloy powder 2 was subjected to a primary sintering in a reducing atmosphere (30%$H_2$-$N_2$). Table 4 shows the sintering conditions and the test results by way of comparison between the method of the present invention and the conventional method. As is clear from the results, with respect to the bimetals produced using the high frequency, the back steel was rapidly heated, and therefore the sintering time required was short, as in Example 1. On the other hand, with the heating effected only by the electric furnace, it took long time to heat the back metal to the sintering temperature, and the total sintering time required for the comparative bimetals was more than twice that for the bimetals of the present invention utilizing the high frequency. Particularly, much time was required in the case where the back metal was thick.

In the above Examples 1 to 3, although the back steel plated with copper was used so as to enhance the bonding which is well known in the art, the back steel is not limited to such a type. The copper alloy powder to be sintered may be distributed onto a well-known back steel having no copper plating. Although the thickness of the copper plating layer on the back metal is 10 $\mu$m in the above Examples 1 to 3, this thickness may be in the range of several $\mu$m to several tens of $\mu$m, depending on the material and the application.

Although the copper plating is used in the above Examples 1 to 3, any other suitable metal (e.g. nickel) plating and alloy plating, may be used. A resin was impregnated in the bimetal of the present invention (Example 3), and was baked at a later stage, so that this bimetal can be used as a material for a dry bearing.

TABLE 2

| | (Example 1) Sintering of Copper-Lead Bimetal | | | | | | |
|---|---|---|---|---|---|---|---|
| | Back metal | High-frequency | | Electric furnace | | Total | |
| Method | (thickness × width) mm | Output kw | Heating time minute | Set temperature °C. | Sintering time minute | sintering time minute | Results |
| Method of present invention (high-frequency plus electric furnace) | 1.3 × 150 | 8 | 1 | 850 | 4 | 5 | good |
| | 2.8 × 150 | 20 | 1 | 850 | 4 | 5 | good |
| Conventional method (only electric furnace) | 1.3 × 150 | | | 850 | 5 | 5 | incomplete sintering |
| | | | | 850 | 10 | 10 | rather incomplete sintering |
| | | | | 850 | 15 | 15 | good |
| | 2.8 × 150 | | | 850 | 5 | 5 | rather incomplete sintering |
| | | | | 850 | 10 | 10 | incomplete sintering |
| | | | | 850 | 15 | 15 | good |

TABLE 3

| | (Example 2) Sintering of Lead-Bronze Bimetal | | | | | | |
|---|---|---|---|---|---|---|---|
| | Back metal | High-frequency | | Electric furnace | | Total | |
| Method | (thickness × width) mm | Output kw | Heating time minute | Set temperature °C. | Sintering time minute | sintering time minute | Results |
| Method of present invention (high-frequency plus electric furnace) | 1.3 × 150 | 8 | 1 | 820 | 3 | 4 | good |
| | 2.8 × 150 | 20 | 1 | 820 | 3 | 4 | good |
| Conventional method (only electric furnace) | 1.3 × 150 | | | 820 | 4 | 4 | incomplete sintering |
| | | | | 820 | 8 | 8 | rather incomplete sintering |
| | | | | 820 | 12 | 12 | good |
| | 2.8 × 150 | | | 820 | 4 | 4 | incomplete sintering |
| | | | | 820 | 8 | 8 | incomplete sintering |
| | | | | 820 | 12 | 12 | good |

TABLE 4

| | (Example 3) Sintering of Bronze Bimetal | | | | | | |
|---|---|---|---|---|---|---|---|
| | Back metal | High-frequency | | Electric furnace | | Total | |
| Method | (thickness × width) mm | Output kw | Heating time minute | Set temperature °C. | Sintering time minute | sintering time minute | Results |
| Method of present invention (high-frequency plus electric furnace) | 1.3 × 150 | 8 | 1 | 850 | 3 | 4 | good |
| | 2.8 × 150 | 20 | 1 | 850 | 3 | 4 | good |
| Conventional | 1.3 × 150 | | | 850 | 4 | 4 | incomplete |

TABLE 4-continued

| | (Example 3) Sintering of Bronze Bimetal | | | | | | |
|---|---|---|---|---|---|---|---|
| | Back metal | High-frequency | | Electric furnace | | Total | |
| Method | (thickness × width) mm | Output kw | Heating time minute | Set temperature °C. | Sintering time minute | sintering time minute | Results |
| method (only electric furnace) | 2.8 × 150 | | | 850 | 8 | 8 | sintering rather incomplete sintering |
| | | | | 850 | 12 | 12 | good |
| | | | | 850 | 4 | 4 | incomplete sintering |
| | | | | 850 | 8 | 8 | incomplete sintering |
| | | | | 850 | 12 | 12 | good |

According to the present invention, in the production of the sintered bimetal, the back steel is rapidly heated to a temperature near its Curie point in the reducing atmosphere, utilizing the high-frequency induction heating, and thereafter the sintering is carried out in the electric furnace.

Therefore, the sintering speed can be greatly increased, and an improved productivity and a cost reduction can be achieved. The induction current flows in the back steel in a concentrating manner, so that the powder is heated by the heat transfer from the back steel. Therefore, the sintering starts from the bonding part between the back steel and the alloy, and gradually proceeds toward the outer surface of the alloy. Therefore, the reducing gas flows satisfactorily, and the sintered bimetal of a good quality can be obtained.

What is claimed is:

1. A method of producing a bimetal for use as a material for a plain bearing, comprising the steps of:
    (a) placing copper alloy powder on a back metal of steel;
    (b) preheating said back steel and said copper alloy powder to a temperature near a Curie point of the steel in a reducing atmosphere by high-frequency induction heating; and
    (c) heating said preheated back steel and copper alloy powder to a temperature of 770° C. to 950° C. in one of an electric resistance furnace and a gas furnace in a reducing atmosphere so that said copper alloy powder is sintered to form a sintered copper alloy layer and at the same time said sintered copper alloy layer is bonded to said back steel, thereby producing said bimetal.

2. A method according to claim 1, further comprising the step of rolling said bimetal after said sintering so as to make said sintered copper alloy layer dense.

3. A method according to claim 2, in which a cycle of said high-frequency induction heating, said sintering and said rolling is repeated at least twice 4. A method according to claim 2, in which at least one of said high-frequency induction heating, said sintering and said rolling is repeated at least twice 5. A method according to claim 1, in which said sintered copper alloy layer is composed of at least one kind selected from the group consisting of a copper-lead alloy, a lead-bronze alloy and a bronze alloy.

6. A method according to claim 1, in which said high-frequency induction heating is carried out at a frequency of not less than 100 kHz.

7. A method according to any one of claims 1 to 6 in which a copper plating layer is interposed between said back metal of steel and said sintered copper alloy layer.

* * * * *